Patented Dec. 29, 1931

1,839,124

UNITED STATES PATENT OFFICE

PAUL SEIDLER, OF WEISSAND, GERMANY

METHOD OF PRODUCING BIG CRYSTALS

No Drawing. Application filed December 3, 1928, Serial No. 323,552, and in Germany August 10, 1926.

I have filed applications for this invention in Germany, November 25, 1926; March 9, 1927, and Nov. 14, 1927; Austria, November 29, 1926; Great Britain, August 10, 1927; France, December 7, 1927.

In my copending application Ser. No. 150,381, filed November 23, 1926, I have described a method of producing big crystals, especially big crystals of ammonium chloride. This method mainly consists in adding vegetable substances, for instance in the form of an extract, to a salt solution from which it is desired to obtain the crystals, whereupon the crystallization is carried out and the formed crystals are removed from the mother liquor and dried.

In the said application I have mentioned several vegetables which are well suited for performing the new method, for instance sugar beets. The effect of this vegetable and of certain other vegetables is due to the fact that the same contain pectin substances. In some cases however it appears that the effect is not brought forth directly by the said substances but by certain decomposition or splitting up products of the same, such as di-galakturon-acid respectively the galakturon-acids (see for instance Felix Ehrlich and Robert von Sommerfeld: "Die Zusammensetzung der Pektinstoffe der Zuckerrübe" in "Biochemische Zeitschrift", volume 168, No. 4/6, page 264). The crystallization may therefore be carried out by adding to the salammoniac solution pectin substances which are produced in any desired way. It is neither necessary to obtain the decomposition bodies from pectin. These bodies may also be produced in any other desired manner. The crystallization process is carried out in the manner set forth in my said application Ser. No. 150,381.

The pectin substances, or the decomposition products of the same can be employed in the presence of acids. The method may however also be carried out in a neutral or in an alkaline solution.

The said substances may be employed alone or together with vegetable substances, for instance with extracts of such substances.

Besides for the producing of big crystals of ammonium chloride the new method is also well suited for the producing of big crystals of other chemical constituents.

*Example 1.*—2000 liters of water are heated to 80–85° C. and at this temperature 1000 kg. of ammonium chloride and 1,5 kg. hydro-pectin are dissolved in the water. Thereupon 10 kg. of muriatic acid of 20–21° Bé. are added under stirring and is allowed to cool so slowly that the original temperature of 80° C. in the course of 8–10 days sinks to the external temperature.

*Example 2.*—Instead of the 1,5 kg. hydropectin mentioned in Example 1 0,6 kg. of the calcium-magneisum-salt of pectin-acid is added. As for the rest the process is carried out as described under Example 1.

The pectin substances, the decomposition products of the same or the other substances of vegetable origin employed in the process need not be added in the form of watery extracts. The extracts of the said matters may be produced separately and evaporated to dryness, whereupon the dried products, that is the evaporation residues, are added to the solution from which the crystals are to be produced. As for the rest the treatment is the same as described in my aforesaid application.

I claim:

1. The method of producing big crystals, which consists in adding decomposition products of pectin to salt solutions, concentrating the salt solutions by evaporating at raised temperature, allowing said salt solutions to cool slowly, removing the formed crystals from the mother liquor and centrifugating and drying such crystals.

2. The method of producing big crystals, which consists in adding decomposition products of pectin in dry state to salt solutions, concentrating the salt solutions by evaporating at raised temperature, allowing said salt solutions to cool slowly, removing the formed crystals from the mother liquor and centrifugating and drying such crystals.

3. The method of producing big crystals, which consists in adding pectin to salt solutions, concentrating the salt solutions by evaporating at raised temperature, allowing said salt solutions to cool slowly, removing the formed crystals from the mother liquor and centrifugating and drying such crystals.

PAUL SEIDLER.